United States Patent [19]

Babcock et al.

[11] Patent Number: 4,852,262

[45] Date of Patent: Aug. 1, 1989

[54] GAUGE FOR IN SITU MEASUREMENT OF BOREHOLE DIAMETER

[75] Inventors: Clarence O. Babcock, Lakewood; George J. Schneider, Golden, both of Colo.

[73] Assignee: United States of America, as represented by the Secretary of the Interior, Washington, D.C.

[21] Appl. No.: 146,504

[22] Filed: Jan. 21, 1988

[51] Int. Cl.[4] .............................................. G01N 3/24
[52] U.S. Cl. ..................................... 33/178 F; 33/302; 33/544; 33/DIG. 2; 73/384
[58] Field of Search ............ 33/178 F, 178 R, DIG. 2, 33/306, 302, 147 H, 147 K, 502, 542, 544; 73/384

[56] References Cited

U.S. PATENT DOCUMENTS

| | | | |
|---|---|---|---|
| 2,777,257 | 1/1957 | Johnson | 33/DIG. 2 |
| 2,799,944 | 7/1957 | McConnell | 33/147 K X |
| 2,801,473 | 8/1957 | Kirk | 33/147 H |
| 3,610,035 | 10/1971 | Handy | 73/784 |

Primary Examiner—William D. Martin, Jr.
Attorney, Agent, or Firm—E. Philip Koltos

[57] ABSTRACT

A gauge for measuring in situ the diameter of a borehole in salt or other soft creeping rock types is provided so that changes in borehole structure can be detected. The gauge comprises a cylindrical body insertable lengthwise into a borehole and having an internal channel wherein sensors can be displaced outwardly when air is directed into the gauge, two air displacement sensors located in the channel having slotted keyways at their inner ends which form an orifice proportional to the distance between the sensors, a pneumatic device capable of providing a stream of air into the gauge body, and a flow meter for measuring air flow through the gauge body. The borehole diameter is determined by directing a stream of air into the gauge body and measuring the air flow which will be proportional to the distance between the sensors when displaced outwardly against the borehole walls. The gauge is advantageous in that it does not itself create artificial stresses or deformations in the borehole walls.

5 Claims, 2 Drawing Sheets

GAUGE FOR IN SITU MEASUREMENT OF BOREHOLE DIAMETER

FIELD OF THE INVENTION

The invention relates in general to a device for measuring deformations or changes in shape of a soft borehole, and in particular, to a gauge which measures in situ borehole diameter by means of a pair of air displacement sensors so as to apply minimal force to the wall of the borehole.

BACKGROUND OF THE INVENTION

In the field of rock mechanics, it is often necessary to measure the stress characteristics of a medium in order to accurately assess the stability of certain rock formations. In particular, it is important to measure the state of stress in salt or other soft creeping rock types which may be used in waste disposal and storage. This information is extremely important with regard to radioactive waste, and nuclear waste storage designers will require accurate in situ readings of stress in a particular soft rock mass in order to plan for safe and adequate storage facilities.

A wide variety of methods have been devised over the years for the purpose of measuring the change in the state of stress of a rock mass which involve placement of an instrument inside of a borehole. All of these previous attempts at accurate measurement of soft rock types were inadequate because the instruments are mostly too stiff and often deform the rock continually during use. The open borehole tends to close under the state of stress by creep, plastic flow or by changes in the state of stress. When a stiff instrument is placed in the borehole, it restricts the hole closure. As a result, the instrument establishes its own stress field around the hole that completely destroys the hole behavior produced by the stress field "far away". The instrument can not then define the rock stress in an adequate way because it is responding to the secondary field it has produced itself.

Some of these rigid prior art borehole devices are known in the patent art. For instance, U.S. Pat. No. 4,574,485 (Kreutz et al.) discloses a borehole measuring device comprised of two longitudinal parts which are kept in contact with the borehole wall by means of a spring. U.S. Pat. No. 4,596,151 (Allwes) discloses a borehole pressure sensor which employs piston assemblies pressed against the borehole walls to detect stress changes, and uses hydraulic fluid to maintain the pistons in contact with the wall. U.S. Pat. No. 4,389,896 (Babcock) discloses a method for gauging boreholes which involves placement of two inclusions inside a borehole, each inclusion having a strain rosette sensor to measure physical properties. Finally, U.S. Pat. No. 3,796,091 (Serata) discloses a borehole stress gauge that consists of two axially movable tubular members fitted with diameter-measuring transducers. Other methods and devices for measuring stress properties in rocks using boreholes and other means are disclosed in Erer et al., *Mining Sci. Tech.* 2:191 (1985).

In addition to creating artificial stresses, some of the above devices are dangerous to use because they employ electric signals which could ignite explosive gases often found in rock formations. At present, there does not exist a device that can safely and accurately measure changing diameters of boreholes in soft creeping rock types either because of the interference on the rock caused by the device itself or the potentially explosive electric signalling means employed in these prior art devices. What is desired, therefore, is a safe, convenient and effective device which can accurately gauge the change in diameter of a borehole without applying any appreciable force on the wall of the borehole, and without the need for potentially dangerous electric signalling.

SUMMARY OF THE INVENTION

According to the present invention, there is provided a gauge for safe and accurate measurement of borehole diameters for use in assessing stresses in rock masses which comprises: a generally cylindrical gauge body having a transverse opening capable of retaining a pair of air displacement sensors and a central passageway for allowing a stream air to enter the opening and force the sensors outwardly against the walls of a borehole; a pair of air displacement sensors which are positioned in the transverse opening and which are displaced outwardly by the stream of air until they are retained by the walls of the borehole, each of said sensors having a slotted internal keyway at its inner end as to create an orifice between the sensors, the area of which will be proportional to the distance between the sensors, so that the diameter of the borehole can be determined by measuring air flow through the orifice when the sensors are forced against the walls of the borehole by the stream of air; means for providing a stream of air into the gauge body; and means for measuring the flow of air through the gauge body. The measurement of the diameter of the borehole is carried out by positioning the device of the present invention inside a borehole, applying a stream of air to the gauge body so that the air displacement sensors with slotted internal keyways at their inner ends are forced outward until they contact the walls of the borehole, and then measuring the flow of air through the orifice created between the sensors which will be proportional to the diameter of the borehole.

BRIEF DESCRIPTION OF THE DRAWINGS

FIG. 3b is a side view of FIG. 3a.

DETAILED DESCRIPTION OF THE PREFERRED EMBODIMENTS

Figure 1:
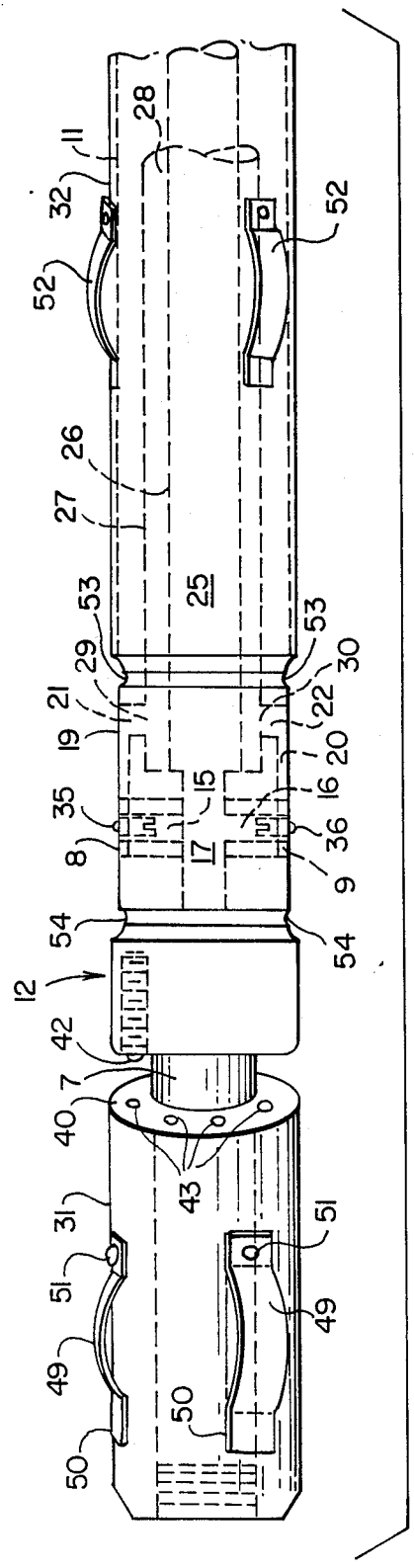
FIG. 1 is a perspective view of the gauge body of the present invention.

In accordance with the present invention, and as best observed in FIGS. 1–4, there is provided a gauge 10 for measuring the diameter of a borehole, particularly in salt or other slow creeping rock, which comprises a generally cylindrical gauge body 12 having a transverse opening 14 capable of slidably retaining a pair of air displacement sensors, 35 and 36, which are fit snugly, but not tightly, in the opening. In the preferred embodiment, the transverse opening 14 is made up of axially aligned transverse chambers 15 and 16 drilled into the sides of the gauge body which lead into central interior opening 17. It is desired that two hardened steel drill bushings 8 and 9, each concentric with chambers 15 and 16, respectively, also be pressed into the gauge body in order to aid in retaining the air displacement sensors.

Sensors 35 and 36 will thus fit into chambers 15 and 16, respectively.

The gauge body 12 also includes a central air passageway 25 for channeling a stream of air into the transverse opening 14 which then flows outwardly through transverse chambers 15 and 16 towards the walls of the borehole. This central air passageway is comprised of inner nested tube 26, which channels air from an air flow source into the gauge, and interior opening 17, by which the incoming air stream is channeled to chambers 15 and 16 containing the air displacement sensors 35 and 36. When set up in this manner, a stream of air flow entering the gauge body 12 will push the air displacement sensors 35 and 36 outwardly until they are retained by the walls of the borehole 61 and 62, as best observed in the schematic shown in FIG. 2.

It is preferred that a return passageway be provided in the gauge of the present invention. This return flow passageway is provided in the gauge body first by means of exterior milled grooves 19 and 20, starting respectively at the outer ends of chambers 15 and 16. The milled grooves 19 and 20 channel air flow from the transverse chambers to two air return holes, 21 and 22, on opposite sides of gauge body 12. The air is returned out of the gauge body by means of an outer nested tube 27 in the interior of body 12, and this flow can also be observed schematically in FIG. 2. The air from air return holes 21 and 22 enters the space 28 between nested tubes 26 and 27 via holes 29 and 30 in outer nested tube 27, and exits via space 28 between the nested tubes. In the desired configuration, the tubes 26 and 27 can be secured inside of the gauge body by means of a plug (not shown) silver soldered or otherwise attached to the inner ends of the tubes. The plug has a central hole to allow the passage of air into the transverse opening where it will displace the sensors outwardly.

shown) can be used to seal the tube assembly to the gauge body, and it is necessary by lugs or other means to prevent the tubes from rotating in the gauge body so that rotational position can be maintained during use of the gauge.

Figure 3A:
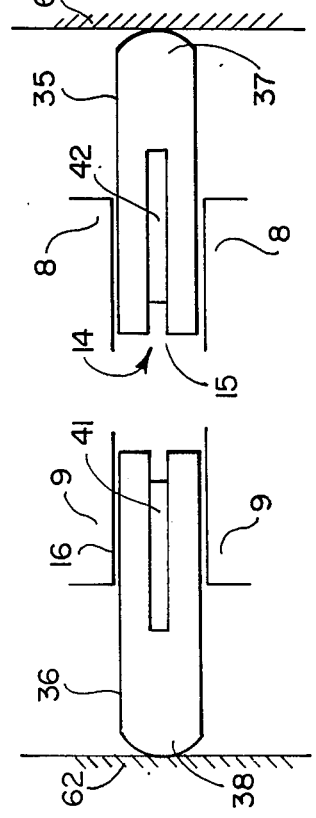
FIG. 3a is a top view of the air displacement sensors in the gauge body of the present invention.
Figure 3B:
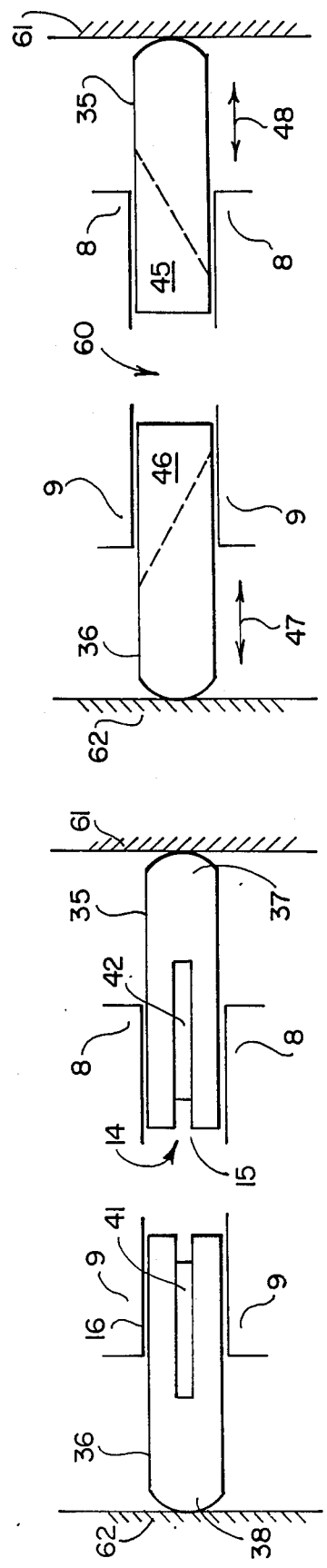
Figure 2:
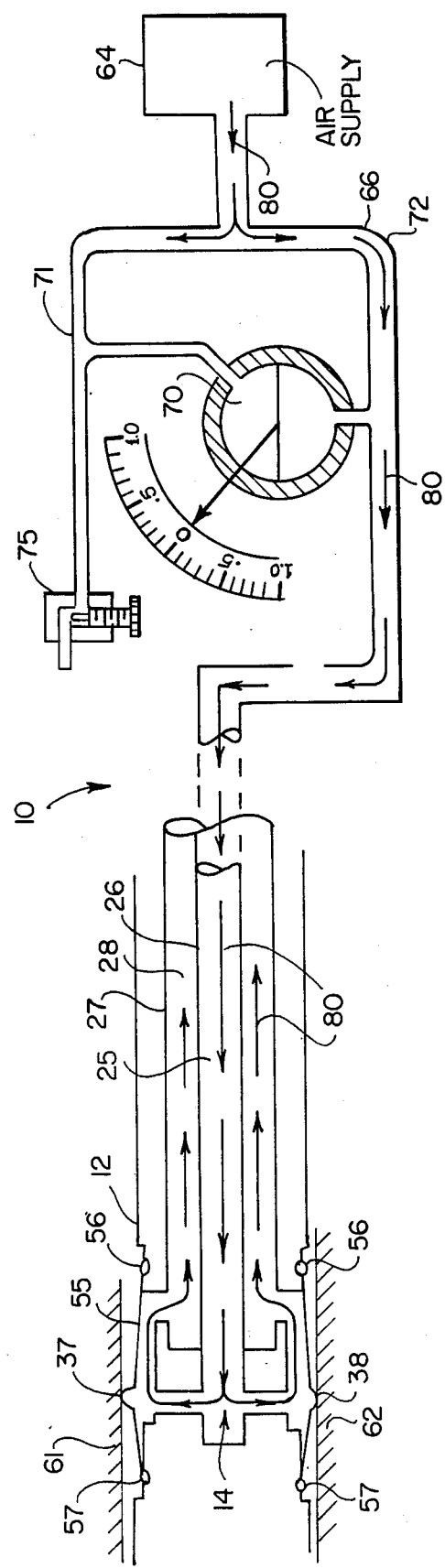
FIG. 2 is a schematic view showing the flow of air into and through the gauge of the present invention.

A pair of air displacement sensors 35 and 36 are provided, as best observed in FIGS. 1, 3a and 3b, which are positioned inside transverse opening 14 so that one sensor will be displaced outwardly until it is retained by one wall of the borehole, and the other sensor will be displaced outwardly until it is retained by the opposite wall of the borehole. In the preferred embodiment, sensor 35 will be disposed inside of chamber 15 and bushing 8 so that it will be displaced outwardly by a stream of air until it contacts wall 61 on one side of the borehole. Sensor 36 will be placed in chamber 16 and bushing 9, and will be retained by wall 62 on the opposite side of the borehole when a stream of air pushes the sensor outwardly. When the sensors are pushed outwardly to the point where they are retained by the walls of the borehole, the distance between the outer ends of the sensors thus defines a diameter of the borehole.

The sensors 35 and 36 can be observed in greater detail in FIGS. 3a and 3b, the top and side views, respectively, of the sensors. The sensors are roughly right circular cylinders with rounded outer ends 37 and 38, and slotted internal keyways 41 and 42 at the inner ends. When the sensors are properly positioned in their respective transverse chambers (elements 15 and 16), the slotted keyways 41 and 42 form a central orifice 60, made up of the combined area 45 and 46, as can be observed, in FIG. 3b. The total area of central orifice 60 is equal to the combined areas 45 and 46 formed between the bottom and sides of keyways 41 and 42 and the edge of the drill bushings 8 and 9. It is preferred that the slotted keyways 41 and 42 have upwardly inclined slopes, as observed in.. FIG. 3b, so that the area of the central orifice 60 will change linearly with the displacements (indicated at 47 and 48) of the air displacement sensors under different borehole diameters. Other configurations, such as a curved upward slope, are possible for these keyways. In any event, the area of central orifice 60 will be proportional to the distance between the sensors. The diameter of the borehole can thus be determined by measuring the air flow through the central orifice, which will be proportional to the area of the orifice, when the sensors are displaced outwardly to the point where they are being retained by the walls of the borehole. Before taking actual measurements, the gauge can be calibrated so that it is known what the distance between the outer ends of the sensors is for a particular measurement of air flow through the gauge body.

In order to properly position the gauge body in the borehole, it preferred that sleeves containing leaf-spring legs be placed over the ends of the gauge body in order to anchor the gauge in the borehole, and to allow rotation of the gauge. It is necessary to rotate the gauge in order to measure the diameter at a number of places along a borehole circumference in order to get an accurate picture of the stresses in the rock. It takes at least three diameters, usually 60° apart but sometimes 45° apart, to measure the hole shape change in an elastic rock to determine the state of secondary principal stresses and strains. If plastic flow occurs, it cannot be detected with only three diameter measurements. By increasing the number of diameters measured, the actual hole shape change can be monitored and the corresponding stress state or stress state change can be determined.

The sleeves for use in the present invention can be observed in FIG. 1. A thick walled sleeve 31 is designed to be placed on the left side 7 of gauge body 12. The sleeve 31 has three leaf-spring legs positioned 120° apart which are preferably held in alignment by three grooves 50 in the sleeve and by screws 51. In order to take measurements at different diameters, the gauge of the present invention can be rotated to a plurality of fixed angular locations by means of an indexed click stop. This indexed click stop is provided by a series of indents 43 in the inner end 40 of sleeve 31 which approaches a spring-loaded ball 42 secured near the center of the gauge body. Preferably, there will be twelve indents, each spaced 30 degrees apart along the inner end of the sleeve, to provide a series of 12 locations for measurements to be made. This will allow readings for six different borehole diameters. However, measurements should be taken at all 12 locations because the two sensors may give slightly different readings for the same location. For example, a reading with sensor 1 at 60° and sensor 2 at 300° may differ slightly with the reading when sensor 2 is at 60° and sensor 1 is at 300°, although the same diameter is being measured. Thus, twelve readings are preferred, and the averages of the two readings 180° apart should be used to best determine the diameters at the six points. For any one given borehole measurement, more or less than six diameter readings may be taken when required.

The sleeve 32 on the right side 11 of gauge body 12 is preferably a thin-walled sleeve. Similarly to the sleeve 31 previously described, it is desirable to have 3 leafspring legs 52 located 120° apart held in alignment by grooves and screws. The legs 52 assist in keeping the gauge centered in the borehole. The two sleeves 31 and 32 are positioned at the ends of the gauge body so as to be far removed from the central area where the gauge measurements will take place. This keeps to an absolute minimum any artificial stresses placed on the rock formation by the gauge itself, particularly at the point where the sensors contact the borehole walls. The two sleeves 31 and 32 act so that when the gauge is inserted in the borehole, and a diameter measurement is taken at a particular position, the right side 11 of the gauge body can be turned thirty degrees to the next indent in the left-hand sleeve 31, which will hold the gauge in place for the next measurement.

Another feature of the present invention is that a membrane is provided around the center of the gauge body to channel the return air flow out of the gauge, and to protect the sensors from any corrosion damage which might be caused if they would come into contact with salt or other soft creeping rock masses. This membrane 55 is observed in the schematic drawing of FIG. 2 and is preferably made of rubber or other suitable elastic material. The rubber membrane 55 has rolled ends 56 and 57 which are designed to fit into two circular grooves, 53 and 54, as observed in FIG. 1, which surround the central measuring area of the gauge. When the gauge is employed to take borehole measurements, the outer ends 37 and 38 of the sensors 35 and 36 extend out from chambers 15 and 16 and are retained through rubber membrane 55 by opposite walls of the borehole 61 and 62, as best observed in FIG. 2.

The gauge 10 of the present invention also comprises a means 64 to provide a flow of air 80 into the gauge body 12. This air supplying means 64, shown schematically in FIG. 2, can be any suitable pneumatic device capable of providing a stream of air 80 which will enter central air passageway 25 and ensure that the sensors will be displaced outwardly to be retained by the walls of the borehole. A regulated supply of air at 45 psi should be sufficient to operate the gauge of the present invention. For use underground, e.g., in mining, bottled air could provide the air source for the gauge if used with a regulator to reduce the air pressure below 145 psi.

It is also necessary to provide a means for measuring the air flow through the gauge body in order to ultimately determine the position of the air displacement sensors and the diameter of the borehole. This flow measuring means 66, which measures the air flow through the gauge body, which will be proportional, to the area of central orifice 60 (see FIG. 3b) is preferably some form of pneumatic device that compares the a flow of air 80 flow rates the gauge body to a standard reference channel in the readout system. This is shown schematically in FIG. 2 where air is supplied by means 64 through a pressure regulator (not shown) to measuring means 66. This measuring means is a conventional air flow meter in which air is channeled to a reference channel 71 including zero setting valve 75 channel 72, through which the air is directed to the gauge body 12. In the set up shown, a mechanical gauge 70 is used to determine the air flow rate through the gauge body 12 as compared with the air flow through the reference channel. This will give the reading of air flow through the gauge of the present invention, and such a reading can be calibrated into a reading of distance between the outer ends of the sensors. The distance between the outer ends of the sensors will define a diameter of the borehole when the sensors are pressed outwardly against the borehole walls. The measuring means for the gauge of the present invention can be any conventional air flow meter known, such as those with digital readouts, and need not be limited to the mechanical measuring device shown.

The preferred method of operation for the borehole gauge of the present invention comprises a first step of positioning the gauge body lengthwise inside a borehole until the sensors are positioned at a desired measurement point. At this measurement point, the air displacement sensors with slotted internal keyways at their inner ends can be displaced outwardly along one axis by a stream of air channeled through the gauge body. A stream of air is then caused to enter the gauge body and is channeled so that the sensors are pushed outwardly until they are retained by the walls of the borehole, and the air travels through the orifice formed by the slotted keyways between the sensors. The area of this orifice will thus be proportional to the diameter of the borehole which restrains the sensors at a given distance. The air flow through the orifice defined by the sensor position is then measured, and is then calibrated with air flow readings at known spacing of the sensors in order to give the diameter of the borehole at the given position and at the particular time measured.

Using the gauge of the present invention, it is then possible to rotate the sensor to a new position, and take a borehole diameter measurement at another angular position along the borehole wall. By taking measurements of diameter at different points around the circumference of the borehole, a true picture of the borehole can be obtained safely and without artificial stresses created by the gauge itself. Over a period of days or weeks, a reading of the shape of the borehole can be obtained so that hole shape changes of the borehole can be monitored. These changes in shape of the borehole will allow a determination of the corresponding stress state of the rock mass. The gauge of the present invention allows one to observe the amplitude of the stresses on a given borehole, the nature of the stresses, whether isotropic or asymmetric, and the direction and angles of the forces involved in changing borehole shape. The use of the borehole gauge of the present invention will be important in safely and accurately measuring hole shape changes in salt and other soft creeping rock types so as to obtain valuable information regarding the state of stresses and strains in these rock formations.

What is claimed is:

1. A gauge for measuring the diameter of a borehole comprising:

a generally cylindrical gauge body insertable lengthwise into a borehole, said gauge body having a transverse opening capable of slidably retaining a pair of air displacement sensors and a central air passageway capable of channeling a flow of air into said transverse opening so as to displace said pair of sensors outwardly towards the walls of the borehole;

a pair of air displacement sensors positionable in said transverse opening so that when a flow of air is channeled into said transverse opening from said central air passageway, said pair of sensors are displaced outwardly towards the walls of the borehole, one sensor towards one wall of the borehole, and the other sensor towards the opposite wall of the borehole, the distance between the outer ends of said sensors thus defining a diameter of the borehole when said sensors are pushed outwardly to the point where they are retained by the walls of the borehole;

each of said air displacement sensors having a slotted internal keyway at its inner end so that when said pair of sensors are positioned in said transverse opening, said slotted keyways form a central orifice between said sensors which provides a passage for air through said gauge body, the area of said central orifice thus being proportional to the distance between said sensors, and the diameter of the borehole, defined by the outer ends of said sensors when said sensors are retained outwardly by the walls of the borehole, being determinable by measuring the flow of air through said central orifice when a flow of air is channeled into said transverse opening so as to displace said sensors outwardly to the point at which they are retained by the walls of the borehole;

means for providing a stream of air into said gauge body; and means for measuring the flow of air through said gauge body.

2. A gauge according to claim 1 which is rotatable in order to allow measurement of the diameter of the borehole at a number of angular locations.

3. A gauge according to claim 2 further comprising an indexed click stop to allow measurement of the diameter of the borehole at a number of angular locations.

4. A gauge according to claim 3 wherein the indexed click stop has a series of twelve indents thirty degrees apart to allow diameter measurements of twelve angular locations along the walls of the borehole.

5. A gauge according to claim I further comprising a elastic membrane which fits over said air displacement sensors in order to channel air out of said gauge body and to protect said sensors from corrosion.

* * * * *